(12) United States Patent
Akahori et al.

(10) Patent No.: US 12,217,488 B2
(45) Date of Patent: Feb. 4, 2025

(54) LEARNING IMAGE GENERATION DEVICE, LEARNING IMAGE GENERATION METHOD, LEARNING IMAGE GENERATION PROGRAM, LEARNING METHOD, LEARNING DEVICE, AND LEARNING PROGRAM

(71) Applicant: FUJIFILM Corporation, Tokyo (JP)

(72) Inventors: Sadato Akahori, Tokyo (JP); Takuya Fuchigami, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 387 days.

(21) Appl. No.: 17/562,988

(22) Filed: Dec. 27, 2021

(65) Prior Publication Data

US 2022/0122350 A1 Apr. 21, 2022

Related U.S. Application Data

(63) Continuation of application No. PCT/JP2020/025121, filed on Jun. 26, 2020.

(30) Foreign Application Priority Data

Jun. 28, 2019 (JP) .................................. 2019-121325

(51) Int. Cl.
*G06T 7/00* (2017.01)
*G06T 7/12* (2017.01)
(Continued)

(52) U.S. Cl.
CPC ........ *G06V 10/7747* (2022.01); *G06T 7/0012* (2013.01); *G06T 2207/10081* (2013.01); *G06T 2207/30016* (2013.01)

(58) Field of Classification Search
CPC ........... G06V 10/7747; G06V 10/7792; G06V 2201/03; G06T 7/0012; G06T 2207/10081;
(Continued)

(56) References Cited

U.S. PATENT DOCUMENTS

2008/0292194 A1* 11/2008 Schmidt ................ G06T 7/0012
382/131
2018/0279983 A1* 10/2018 Ohishi ................... A61B 6/504
(Continued)

FOREIGN PATENT DOCUMENTS

JP H11282822 10/1999
JP 2006337152 12/2006
(Continued)

OTHER PUBLICATIONS

"Office Action of Japan Counterpart Application" with English translation thereof, issued on Jan. 10, 2023, p1-p6.
(Continued)

*Primary Examiner* — Chan S Park
*Assistant Examiner* — D J Dhooge
(74) *Attorney, Agent, or Firm* — JCIPRNET

(57) ABSTRACT

A learning image generation device including: a supervised data acquisition unit that acquires supervised data including a learning image and a correct learning image in which a correct region is defined in the learning image as a pair; and a variation learning image generation unit that generates a variation learning image in which a pixel value of a pixel belonging to the correct region is varied within a limitation range of an allowable pixel value of the pixel belonging to the correct region in the learning image.

15 Claims, 14 Drawing Sheets

(51) Int. Cl.
*G06V 10/00* (2022.01)
*G06V 10/774* (2022.01)

(58) Field of Classification Search
CPC ............. G06T 2207/30016; G06T 7/11; G06T 2207/10088; G06T 2207/10104; G06T 2207/20081; G06T 2207/20084
See application file for complete search history.

(56) References Cited

U.S. PATENT DOCUMENTS

| | | | |
|---|---|---|---|
| 2018/0322366 A1* | 11/2018 | Lim | G06F 18/2155 |
| 2018/0342060 A1* | 11/2018 | Yao | G06N 3/045 |
| 2019/0000425 A1* | 1/2019 | Hu | A61B 8/5269 |
| 2020/0234461 A1* | 7/2020 | Osumi | G06T 7/136 |

FOREIGN PATENT DOCUMENTS

| | | |
|---|---|---|
| JP | 2018005640 | 1/2018 |
| JP | 2019088243 | 6/2019 |
| JP | 2019091308 | 6/2019 |

OTHER PUBLICATIONS

"International Search Report (Form PCT/ISA/210) of PCT/JP2020/025121," mailed on Sep. 15, 2020, with English translation thereof, pp. 1-5.

"Written Opinion of the International Searching Authority (Form PCT/ISA/237)" of PCT/JP2020/025121, mailed on Sep. 15, 2020, with English translation thereof, pp. 1-8.

* cited by examiner

Bc0   Bc2

US 12,217,488 B2

LEARNING IMAGE GENERATION DEVICE, LEARNING IMAGE GENERATION METHOD, LEARNING IMAGE GENERATION PROGRAM, LEARNING METHOD, LEARNING DEVICE, AND LEARNING PROGRAM

CROSS-REFERENCE TO RELATED APPLICATIONS

This application is a continuation application of International Application No. PCT/JP2020/025121, filed on Jun. 26, 2020, which is incorporated herein by reference in its entirety. Further, this application claims priority from Japanese Patent Application No. 2019-121325, filed on Jun. 28, 2019, the disclosure of which is incorporated by reference herein.

BACKGROUND

Technical Field

The present disclosure relates to a learning image generation device, a learning image generation method, a learning image generation program, a learning method, a learning device, and a learning program.

Related Art

Machine learning technology using deep learning has been attracting attention in recent years. In machine learning, various technologies have been developed to further improve the accuracy of classification. JP2018-5640A discloses a method of generating a convolutional neural network (CNN) by deep learning based on first supervised data including a plurality of first images showing defects, inputting each of a plurality of second images showing defects into an interlayer of the CNN, acquiring a plurality of types of feature amounts for the plurality of second images, respectively, from the interlayer, and constructing a model with improved classification accuracy by further performing machine learning by using the plurality of types of feature amounts.

On the other hand, a method of learning a model by end-to-end deep learning using supervised data including a learning image and a correct learning image in which a correct region is defined in the learning image as a pair has been known. The end-to-end deep learning is a method of learning all of intermediate processes that occur in the process from giving of an input to an output of a result. In a learning model learned by the end-to-end deep learning, by inputting an image into the learning model, it is possible to perform semantic segmentation that performs classification by labeling the entire input image in pixel units.

In general, in end-to-end deep learning, it has been known that an output result having higher accuracy can be obtained as a larger amount of learning images and correct learning image are present on an input side and an output side, respectively. However, in a case in which an image to be input is, for example, a brain image of a brain that has developed a disease, such as a cerebral apoplexy, a shape, a size, and a developing location of a diseased region, such as an infarcted region and a bleeding region, to be segmented are undefined. In addition, a pixel value of the diseased region in the brain image is varied in response to the elapsed time from the developing of the disease. Therefore, there are various cases in the brain image, and it is difficult to prepare the learning image that can cover all of the various cases.

SUMMARY

The present disclosure provides a learning image generation device, a learning image generation method, a learning image generation program, a learning method, a learning device, and a learning program which can cover variety of pixel values of an image region to be segmented, by using a limited learning image.

A first aspect of the present disclosure relates to a learning image generation device comprising a supervised data acquisition unit that acquires supervised data including a learning image and a correct learning image in which a correct region is defined in the learning image as a pair, and a variation learning image generation unit that generates a variation learning image in which a pixel value of a pixel belonging to the correct region is varied within a limitation range of an allowable pixel value of the pixel belonging to the correct region in the learning image.

In a second aspect of the present disclosure, according to the first aspect, a limitation range acquisition unit that acquires the limitation range may be further provided.

In a third aspect of the present disclosure, according to the first or second aspect, the variation learning image generation unit may vary the pixel values of one or more pixels among the pixels belonging to the correct region by a certain value.

In a fourth aspect of the present disclosure, according to the first or second aspect, the variation learning image generation unit may vary the pixel values of one or more pixels among the pixels belonging to the correct region by a value different for each pixel.

In a fifth aspect of the present disclosure, according to the first or second aspect, the variation learning image generation unit may vary the pixel values of one or more pixels among the pixels belonging to the correct region by a value different for each pixel in response to a normal distribution set based on the pixel value of the pixel belonging to the correct region.

A sixth aspect of the present disclosure relates to a learning image generation method comprising acquiring supervised data including a learning image and a correct learning image in which a correct region is defined in the learning image as a pair, and generating a variation learning image in which a pixel value of a pixel belonging to the correct region is varied within a limitation range of an allowable pixel value of the pixel belonging to the correct region in the learning image.

A seventh aspect of the present disclosure relates to a learning image generation program causing a computer to function as a supervised data acquisition unit that acquires supervised data including a learning image and a correct learning image in which a correct region is defined in the learning image as a pair, and a variation learning image generation unit that generates a variation learning image in which a pixel value of a pixel belonging to the correct region is varied within a limitation range of an allowable pixel value of the pixel belonging to the correct region in the learning image.

Another aspect of the present disclosure relates to a learning image generation device comprising a memory that stores a command to be executed by a computer and a processor configured to execute the stored command, in which the processor executes acquiring supervised data including a learning image and a correct learning image in which a correct region is defined in the learning image as a pair, and generating a variation learning image in which a pixel value of a pixel belonging to the correct region is varied within a limitation range of an allowable pixel value of the pixel belonging to the correct region in the learning image.

An eighth aspect of the present disclosure relates to a learning method comprising learning a model by using one or more first supervised data including a learning image and a correct learning image in which a correct region is defined in the learning image as a pair, and one or more second supervised data including one or more variation learning images generated by varying a pixel value of a pixel belonging to the correct region within a limitation range of an allowable pixel value of the pixel belonging to the correct region in the learning image and the correct learning image in which the correct region is defined in the learning image before variation in each of the one or more variation learning images as a pair.

Note that in the above aspect, the pixel value of the one or more pixels among the pixels belonging to the correct region may be varied by a certain value, the pixel values of one or more pixels among the pixels belonging to the correct region may be varied by a value different for each pixel, and the pixel values of one or more pixels among the pixels belonging to the correct region may be varied by a value different for each pixel in response to a normal distribution set based on the pixel value of the pixel belonging to the correct region.

In a ninth aspect of the present disclosure, according to the eighth aspect, the model may be learned by using a plurality of the first supervised data in first learning, and the model may be learned by replacing at least one first supervised data among the plurality of first supervised data with the second supervised data in second and subsequent learning.

In a tenth aspect of the present disclosure, according to the eighth aspect, the model may be learned by using a plurality of the first supervised data in first learning, and the model may be learned by adding at least one second supervised data in second and subsequent learning.

In an eleventh aspect of the present disclosure, according to the ninth or tenth aspect, at least one of the second supervised data to be used or the number of the second supervised data may be randomly set for each learning in the second and subsequent learning.

In a twelfth aspect of the present disclosure, according to the ninth or tenth aspect, at least one of the second supervised data to be used or the number of the second supervised data may be set in advance in the second and subsequent learning.

In a thirteenth aspect of the present disclosure, according to any one of the ninth to twelfth aspects, the model may be learned by using only the plurality of first supervised data at least once in the second and subsequent learning.

A fourteenth aspect of the present disclosure relates to a learning device comprising a supervised data acquisition unit that acquires one or more first supervised data including a learning image and a correct learning image in which a correct region is defined in the learning image as a pair, and one or more second supervised data including one or more variation learning images generated by varying a pixel value of a pixel belonging to the correct region within a limitation range of an allowable pixel value of the pixel belonging to the correct region in the learning image and the correct learning image in which the correct region is defined in the learning image before variation in each of the one or more variation learning images as a pair, and a learning unit that learns a model by using the one or more first supervised data and the one or more second supervised data acquired by the supervised data acquisition unit.

Still another aspect of the present disclosure relates to a learning device comprising a memory that stores a command to be executed by a computer and a processor configured to execute the stored command, in which the processor executes learning a model by using one or more first supervised data including a learning image and a correct learning image in which a correct region is defined in the learning image as a pair, and one or more second supervised data including one or more variation learning images generated by varying a pixel value of a pixel belonging to the correct region within a limitation range of an allowable pixel value of the pixel belonging to the correct region in the learning image and the correct learning image in which the correct region is defined in the learning image before variation in each of the one or more variation learning images as a pair.

In a fifteenth aspect of the present disclosure, according to the fourteenth aspect, the learning unit may learn the model by the learning method described above.

A sixteenth aspect of the present disclosure relates to a learning program causing a computer to function as a supervised data acquisition unit that acquires one or more first supervised data including a learning image and a correct learning image in which a correct region is defined in the learning image as a pair, and one or more second supervised data including one or more variation learning images generated by varying a pixel value of a pixel belonging to the correct region within a limitation range of an allowable pixel value of the pixel belonging to the correct region in the learning image and the correct learning image in which the correct region is defined in the learning image before variation in each of the one or more variation learning images as a pair, and a learning unit that learns a model by using the one or more first supervised data and the one or more second supervised data acquired by the supervised data acquisition unit.

According to the aspects described above, the learning image generation device, the learning image generation method, the learning image generation program, the learning method, the learning device, and the learning program according to the present disclosure can cover variety of the pixel values of the image region to be segmented, by using a limited learning image.

DESCRIPTION OF EMBODIMENTS

Figure 1:
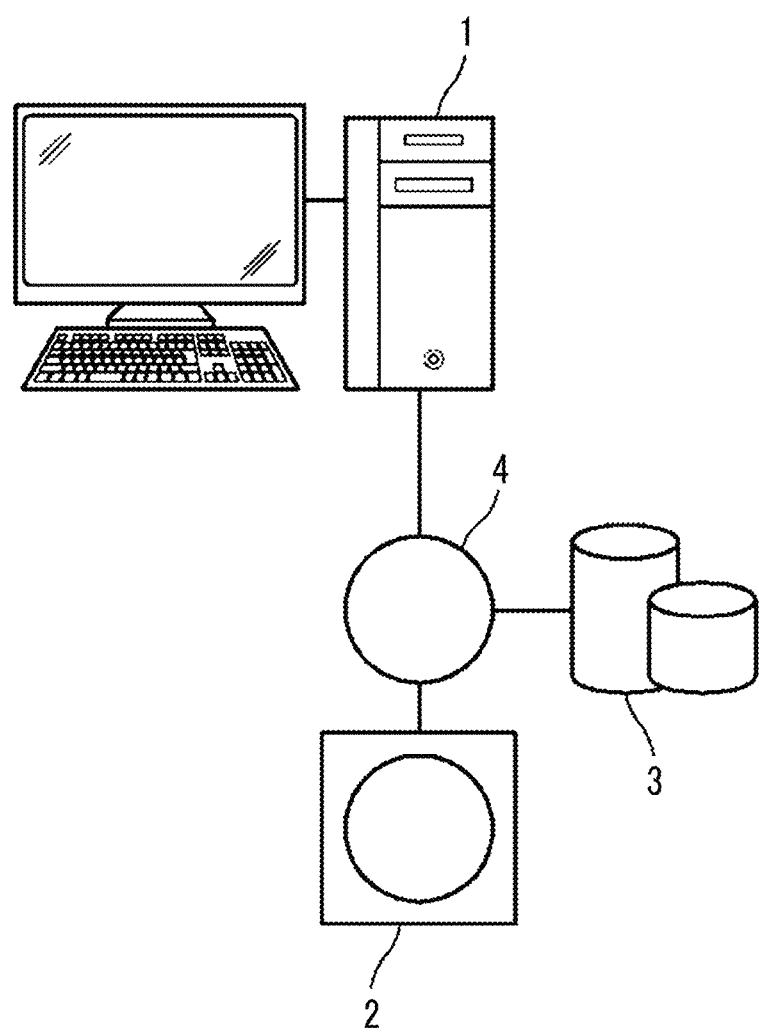
FIG. 1 is a hardware configuration diagram showing an outline of a diagnosis support system to which a learning image generation device and a learning device according to an exemplary embodiment of the present disclosure are applied.

Hereinafter, a first exemplary embodiment of the present disclosure will be described with reference to the drawings. FIG. 1 is a hardware configuration diagram showing an outline of a diagnosis support system to which a learning image generation device and a learning device according to the first exemplary embodiment of the present disclosure are applied. As shown in FIG. 1, in the diagnosis support system, a learning device 1 according to the present exemplary embodiment, a three-dimensional image capturing device 2, and an image storage server 3 are connected via a network 4 in a communicable state. Note that the learning device 1 encompasses a learning model and a learning image generation device according to the present exemplary embodiment.

The three-dimensional image capturing device 2 is a device that images a site to be diagnosed of a subject and generates a three-dimensional image representing the site. Specifically, the three-dimensional image capturing device 2 is a computed tomography (CT) device, a magnetic resonance imaging (MRI) device, a positron emission tomography (PET) device, and the like. A medical image generated by the three-dimensional image capturing device 2 is transmitted to the image storage server 3 and stored therein. Note that in the present exemplary embodiment, the site to be diagnosed of a patient as the subject is a brain, and the three-dimensional image capturing device 2 is the CT device. In addition, in the CT device, a three-dimensional CT image Bc0 including the brain of the subject is generated.

The image storage server 3 is a computer that stores and manages various data, and comprises a large capacity external storage device and database management software. The image storage server 3 performs communication with other devices via the wired or wireless network 4 to transmit and receive image data. Specifically, the image storage server 3 acquires various data including image data of the CT image generated by the three-dimensional image capturing device 2 via the network, and stores and manages the data in a recording medium, such as the large capacity external storage device. Note that a storage format of the image data and the communication between the devices via the network 4 are based on a protocol, such as digital imaging and communication in medicine (DICOM). In addition, in the present exemplary embodiment, the image storage server 3 also stores and manages first supervised data D (to be described below) including the CT image Bc0 which is a learning image for learning a learning model 25 to be described below.

The learning device 1 including the learning image generation device according to the present exemplary embodiment and the learning model is a device in which a learning image generation program and a learning program according to the present disclosure are installed in one computer. The computer may be a workstation or a personal computer directly operated by a doctor who makes a diagnosis, or may be a server computer connected to the workstation or the personal computer via the network. The learning image generation program and the learning program are recorded in a recording medium, such as a digital versatile disc (DVD) or a compact disc read only memory (CD-ROM) to be distributed, and are installed in the computer from the recording medium. Alternatively, the learning image generation program and the learning program are stored in a storage device of the server computer connected to the network or a network storage to be accessible from the outside, and are downloaded and installed in the computer used by the doctor in response to a request.

Figure 2:
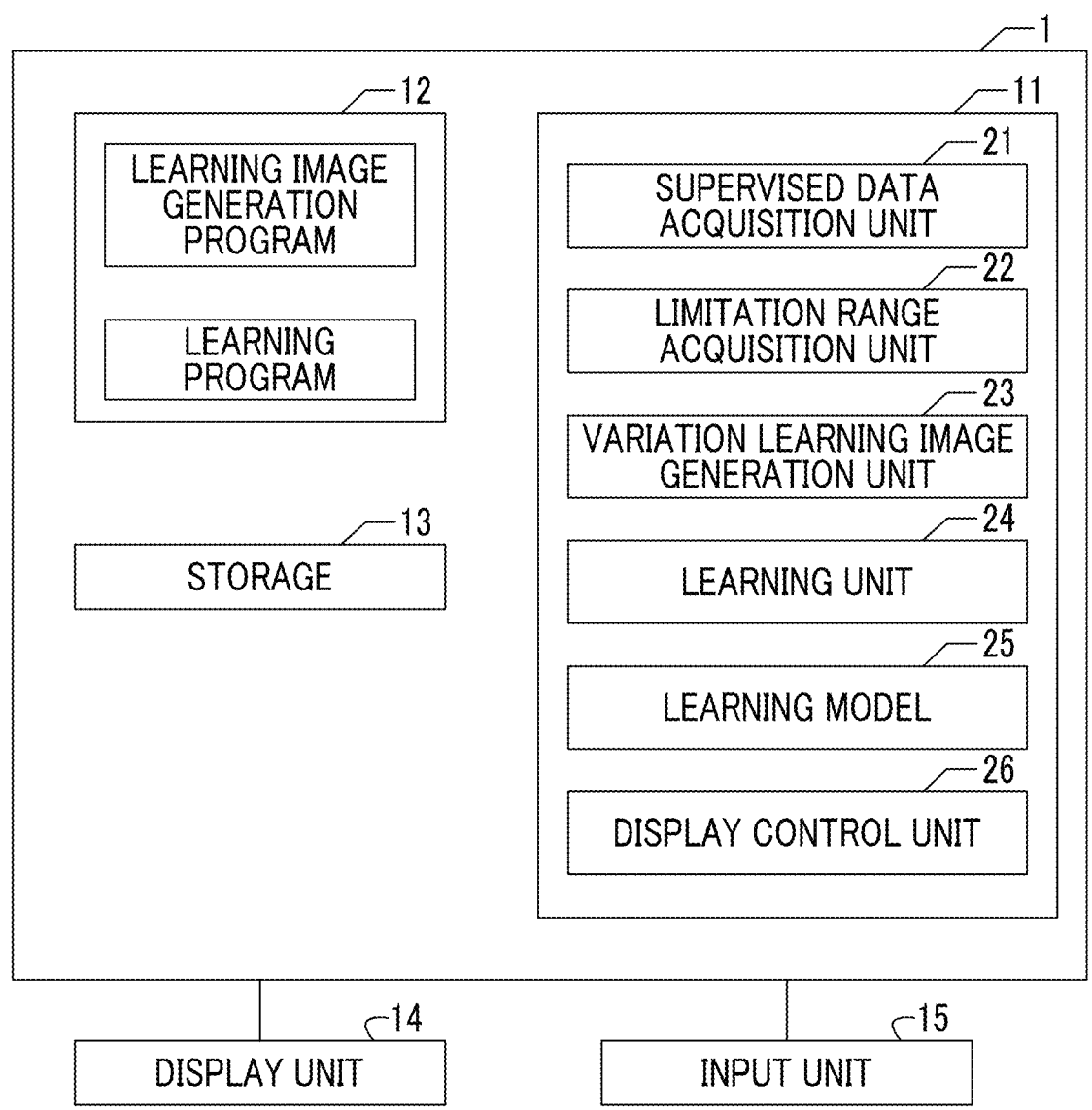
FIG. 2 is a schematic block diagram showing a configuration of the learning device according to the exemplary embodiment of the present disclosure.

FIG. 2 is a diagram showing a schematic configuration of the learning device 1 which is the exemplary embodiment of the present disclosure realized by installing the learning image generation program and the learning program on the computer. As shown in FIG. 2, the learning device 1 comprises a central processing unit (CPU) 11, a memory 12, and a storage 13, as a configuration of a standard workstation. In addition, the learning device 1 is connected to a display unit 14 including a liquid crystal display and the like and an input unit 15 including a keyboard, a mouse, and the like. The input unit 15 receives various setting inputs by a user. Note that the display unit 14 and the input unit 15 may be used in combination by using a touch panel.

The storage 13 includes a hard disk drive, a solid state drive (SSD), and the like. The storage 13 stores the first supervised data D including the CT image Bc0, which is the learning image for learning the learning model 25 to be described below acquired by the image storage server 3 via the network 4, and various pieces of information including information required for the process.

In addition, the learning image generation program and the learning program are stored in the memory 12. The learning image generation program defines a supervised data acquisition process, a limitation range acquisition process, and a variation learning image generation process as processes to be executed by the CPU 11. In the supervised data acquisition process, the first supervised data D including the learning image and a correct learning image in which a correct region is defined in the learning image as a pair is acquired. In the limitation range acquisition process, a limitation range of an allowable pixel value of the pixel belonging to the correct region in the learning image is acquired. In the variation learning image generation process, the variation learning image in which the pixel value of the pixel belonging to the correct region is varied within the limitation range is generated.

In addition, the learning program defines the supervised data acquisition process, a learning process, a discrimination process, and a display control process as processes to be executed by the CPU 11. In the supervised data acquisition process, one or more first supervised data including a learning image and a correct learning image in which a correct region is defined in the learning image as a pair, and one or more second supervised data including one or more variation learning images generated by varying a pixel value of a pixel belonging to the correct region within the limitation range of the allowable pixel value of the pixel belonging to the correct region in the learning image and the correct learning image in which the correct region is defined in the learning image before variation in each of the one or more variation learning images as a pair are acquired. In the learning process, the model is learned by using the one or more first supervised data and one or more second supervised data, which are acquired. In the discrimination process, in a case in which the learning image or a target image to be discriminated is input, the correct region in the input image is output. In the display control process, the learning image, the correct learning image, the correct region, and the like are displayed on the display unit 14.

Then, by the CPU 11 executing these processes in response to the program, the computer functions as a supervised data acquisition unit 21, a limitation range acquisition unit 22, a variation learning image generation unit 23, a learning unit 24, the learning model 25, and a display control unit 26. Here, the supervised data acquisition unit 21, the limitation range acquisition unit 22, and the variation learning image generation unit 23 configure the learning image generation device according to the present exemplary embodiment.

Figure 3:
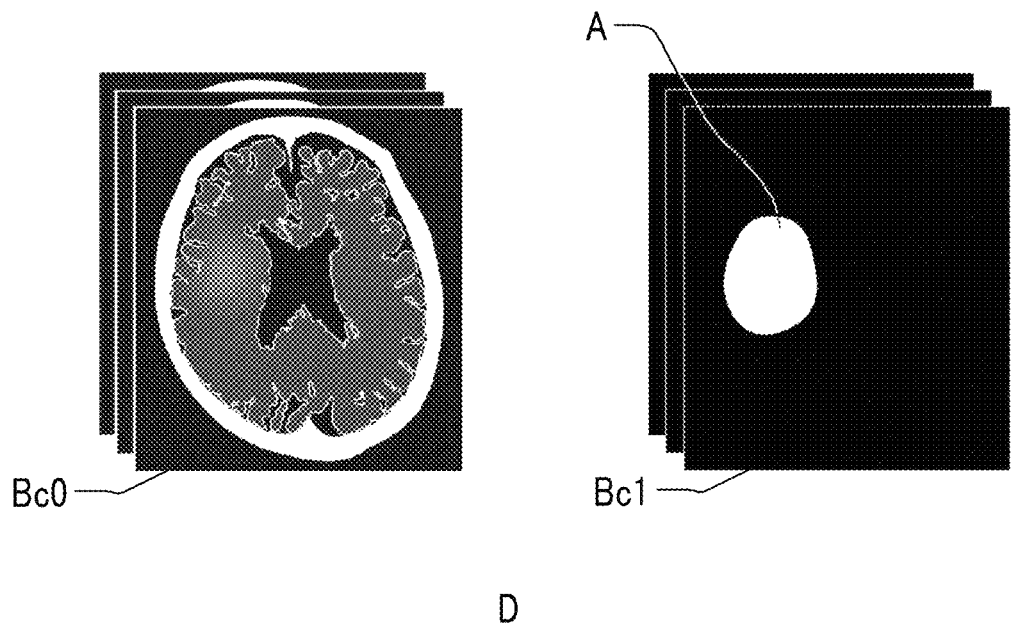
FIG. 3 is a diagram for describing first supervised data including a CT image and a correct CT image as a pair.

The supervised data acquisition unit 21 acquires the first supervised data D from the image storage server 3 via an interface (not shown) connected to the network. FIG. 3 is a diagram for describing the first supervised data D including the CT image Bc0 and a correct mask Bc1 as a pair. As shown in FIG. 3, the first supervised data D is supervised data including the CT image Bc0 which is the learning image for learning the learning model 25 to be described below, and the correct mask Bc1 in which an infarcted region A is defined as the correct region in the CT image Bc0 as a pair. Note that in FIG. 3, although the CT image Bc0 is the three-dimensional image, here, for the sake of description, the description will be made by using a two-dimensional tomographic image on one tomographic plane of the CT image Bc0. In addition, in FIG. 3, the correct mask Bc1 is defined by drawing by filling the infarcted region A, which is the correct region, with white, but the correct mask Bc1 is not limited to this. For example, the infarcted region A may be defined by drawing a boundary of the infarcted region A in white without filling the inside of the infarcted region A. In addition, the infarcted region A may be drawn in a color other than white. In addition, the infarcted region A may be defined by forming an image in which the inside of the infarcted region A and the outside of the infarcted region A are constituted by pixels having different pixel values.

Note that the CT image Bc0 according to the present exemplary embodiment corresponds to the learning image of the present disclosure, and the correct mask Bc1 according to the present exemplary embodiment corresponds to the correct learning image of the present disclosure. In addition, in a case in which the CT image Bc0 and the correct mask Bc1, that is, the first supervised data D is already stored in the storage 13, the supervised data acquisition unit 21 may acquire the first supervised data D from the storage 13. In addition, the supervised data acquisition unit 21 acquires the first supervised data D for a large number of subjects for learning the learning model 25 to be described below. In addition, the supervised data acquisition unit 21 acquires second supervised data F to be described below from the storage 13.

The display control unit 26 displays the CT image Bc0, the correct mask Bc1, and a variation CT image Bc2 that constitute the first supervised data D and the second supervised data F acquired by the supervised data acquisition unit 21, respectively, on the display unit 14.

The limitation range acquisition unit 22 acquires the limitation range of the allowable pixel value of the pixel belonging to the infarcted region A in the CT image Bc0. In the present exemplary embodiment, the CT image Bc0 is the CT image. Generally, about 60% of a human body is made of water, so a CT value expresses water as origin of 0 and a state of air as a minimum value of −1000. Air of −1000 is set to be expressed in black on the CT image Bc0. That is, the CT image Bc0 is expressed by giving a black and white shading value (also referred to as pixel value) to each pixel constituting the image in a case of the two-dimensional image and a voxel constituting the image in a case of the three-dimensional image.

On the CT image Bc0, the allowable pixel value of the infarcted region A in the acute phase is about 20 to 30. Therefore, in the present exemplary embodiment, the limitation range acquisition unit 22 acquires a lower limit value L of the limitation range of the allowable pixel value of the infarcted region A as 20 and an upper limit value U thereof as 32. The values of the lower limit value L and the upper limit value U are input by operating the input unit 15 by the user. Note that in the present exemplary embodiment, the values of the lower limit value L and the upper limit value U are input by the user, but the technology of the present disclosure is not limited to this. For example, a correspondence table in which the lower limit value L and the upper limit value U are set for each type of image, such as the CT image, an MRI image, and a PET image may be stored in the storage 13 in advance, the values of the lower limit value L and the upper limit value U may be derived from the correspondence table in response to the type of the learning image constituting the first supervised data D acquired by the supervised data acquisition unit 21. In addition, as long as the values of the lower limit value L and the upper limit value U can be derived from the type of the learning image, the value may be derived, for example, by an expression without being limited to the correspondence table.

In addition, in the present exemplary embodiment, since the correct region is the infarcted region A, the limitation range acquisition unit 22 acquires the lower limit value L of the limitation range of the allowable pixel value of the infarcted region A as 20 and the upper limit value U thereof as 32. However, the values of the lower limit value L and the upper limit value U, that is, the limitation range described above is appropriately set in response to a target to be detected. For example, in a case in which the learning image is the CT image, and in a case in which it is desired to detect cerebral hemorrhage in the brain image, the correct region is a bleeding region, and thus the limitation range of the allowable pixel value of the bleeding region is about 50 to 80.

Note that the values of the lower limit value L and the upper limit value U of the pixel values may be set based on for example, numerical data obtained by collecting statistics in advance for each type, model number, and manufacturer of the device that images the learning image, imaging facility, and type of lesion to be detected.

Figure 4:
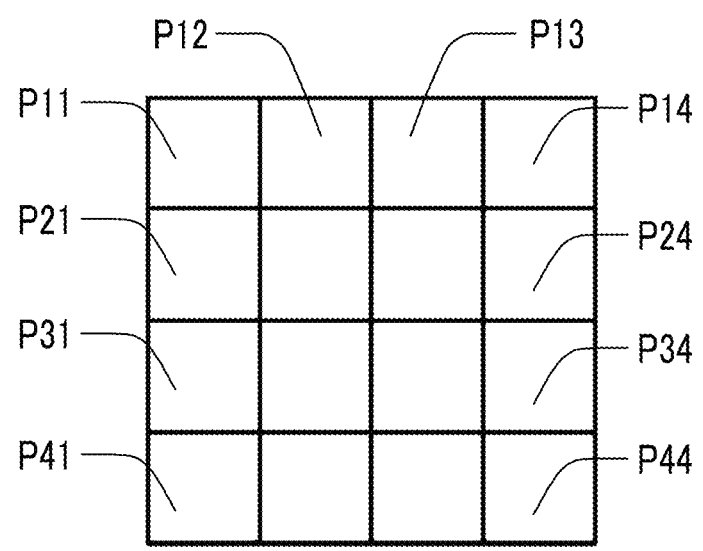
FIG. 4 is a diagram for describing an infarcted region.

The variation learning image generation unit 23 generates the variation CT image Bc2 which is the variation learning image in which the pixel value of the pixel belonging to the infarcted region A are varied within the limitation range of the allowable pixel value of the pixel belonging to the infarcted region A in the CT image Bc0. FIG. 4 is a diagram for describing the infarcted region A. Note that in FIG. 4, although the shape is different from the actual shape of the infarcted region A, in order to make the description easier to understand, the infarcted region A is described as a square region constituted by 16 pixels in 4 rows and 4 columns.

Figure 5:
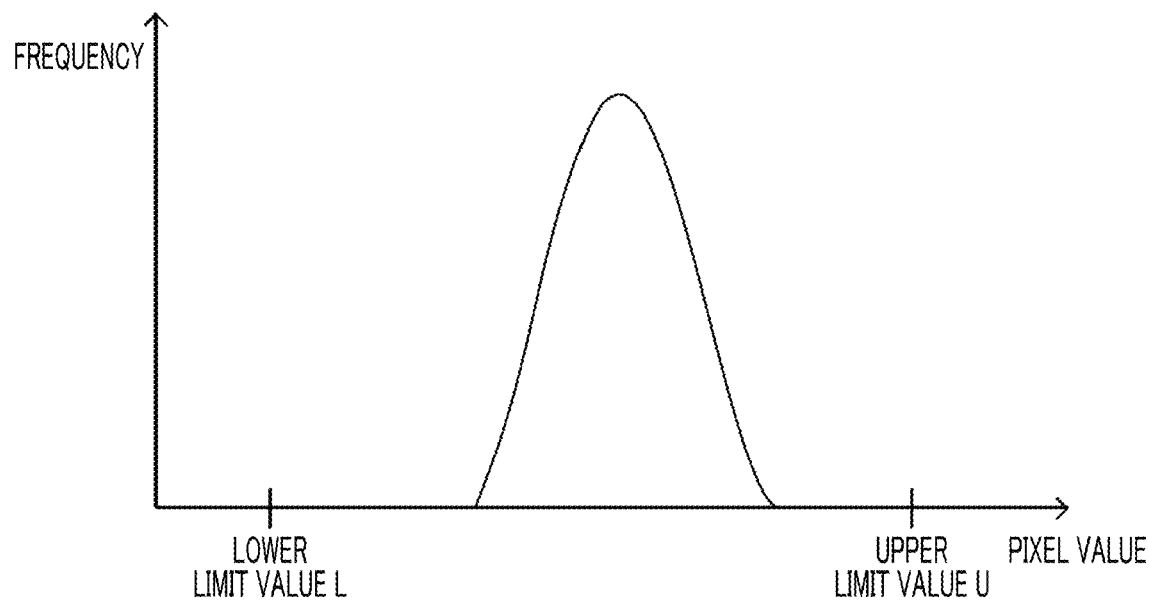
FIG. 5 is a graph showing a distribution of pixel values of pixels belonging to the infarcted region.
Figure 6:
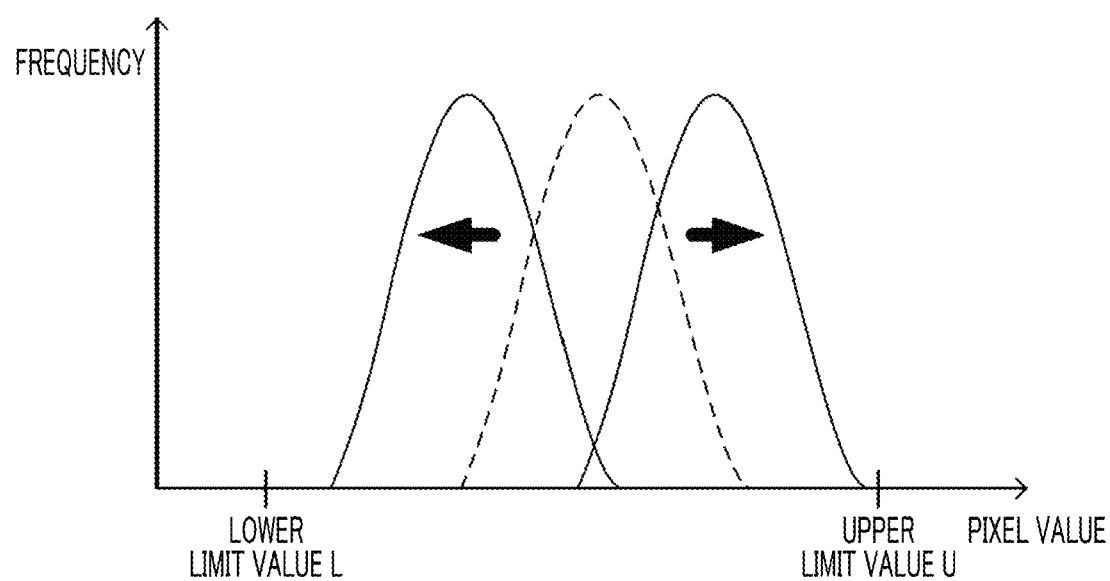
FIG. 6 is a graph for describing a variation in the pixel values of the pixels belonging to the infarcted region.

As shown in FIG. 4, the infarcted region A is constituted by 16 pixels P11 to P44 arranged in 4 rows and 4 columns. Since each pixel of the pixels P11 to P44 constituting the infarcted region A is a pixel indicating the infarcted region, and has the pixel value of 20 or more and 32 or less. FIG. 5 is a graph showing a distribution of the pixel values of the pixels P11 to P44 belonging to the infarcted region A, and FIG. 6 is a graph for describing a variation of the pixel values of the pixels belonging to the infarcted region A. Note that in FIGS. 5 and 6, a horizontal axis indicates the pixel value and a vertical axis indicates a frequency of appearance.

As shown in FIG. 5, the pixel values of the pixels P11 to P44 constituting the infarcted region A are distributed between the lower limit value L (20) and the upper limit value U (32) of the limitation range of the allowable pixel value of the infarcted region A. For example, in a case in which a maximum value of the pixel values of the pixels P11 to P44 constituting the infarcted region A is 25, it is possible to add up to the value of "7" that reaches 32 of the upper limit value U of the limitation range described above. Therefore, a numerical value of 0 or more and 7 or less is randomly selected, and the selected numerical value is added to the pixel values of all of the pixels P11 to P44 constituting the infarcted region A. As a result, as shown in FIG. 6, the distribution, which is shown by a dotted line, of the pixel values of the pixels P11 to P44 belonging to the infarcted region A is shifted in a right arrow direction by the added numerical value, and becomes the distribution shown by a solid line.

On the other hand, in a case in which a minimum value of the pixel values of the pixels P11 to P44 constituting the infarcted region A is 22, it is possible to subtract up to the value of "2" that reaches 20 of the lower limit value L of the limitation range described above. Therefore, a numerical value of 0 or more and 2 or less is randomly selected, and the selected numerical value is subtracted from the pixel values of all of the pixels P11 to P44 constituting the infarcted region A. As a result, as shown in FIG. 6, the distribution, which is shown by the dotted line, of the pixel values of the pixels P11 to P44 belonging to the infarcted region A is shifted in a left arrow direction by the subtracted numerical value, and becomes the distribution shown by the solid line.

Note that the number of numerical values, which are randomly selected from the numerical value of 0 or more and 7 or less and the numerical value of 0 or more and 2 or less, is determined based on a preset number of the variation CT images Bc2 (to be described below) to be generated. For example, in a case in which it is desired to generate three variation CT images Bc2, three numerical values are randomly selected from the numerical value of 0 or more and 7 or less and the numerical value of 0 or more and 2 or less. Note that the number of the variation CT images Bc2 to be generated can be optionally set by the user using the input unit 15.

Figure 7:
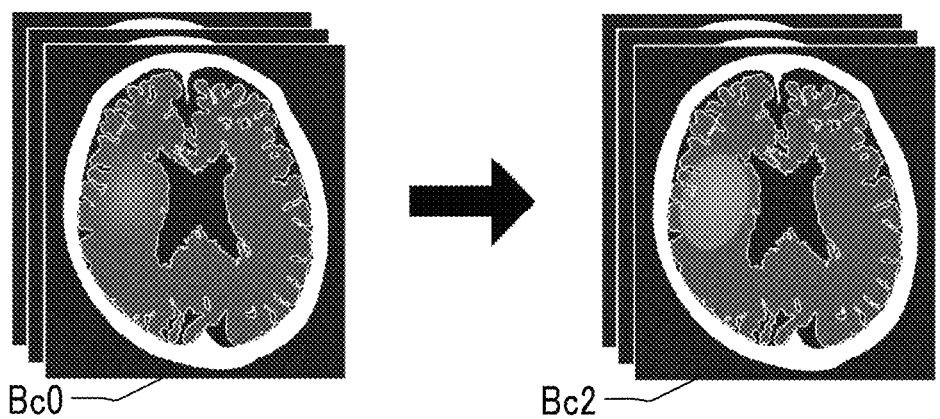
FIG. 7 is a diagram for describing a variation CT image generated by adding the variation to the CT image.

The variation learning image generation unit 23 generates the variation CT image Bc2 by varying the pixel value of the pixel belonging to the infarcted region A based on the selected numerical value, that is, a shift amount. FIG. 7 is a diagram for describing the variation CT image Bc2 generated by adding the variation to the CT image Bc0. Note that in FIG. 7, in the variation CT image Bc2, the pixel value of the infarcted region A is exaggerated and varied in order to clearly show the difference from the CT image Bc0.

As shown in FIG. 7, the variation learning image generation unit 23 adds the numerical value selected from the numerical value of 0 or more and 7 or less to the pixel values of all of the pixels belonging to the infarcted region A in the CT image Bc0, or subtracts the numerical value selected from the numerical value of 0 or more and 2 or less from the pixel values of all of the pixels belonging to the infarcted region A in the CT image Bc0. As a result, the variation learning image generation unit 23 generates the variation CT image Bc2 in which the pixel value of the infarcted region A of the CT image Bc0 is varied.

Figure 8:
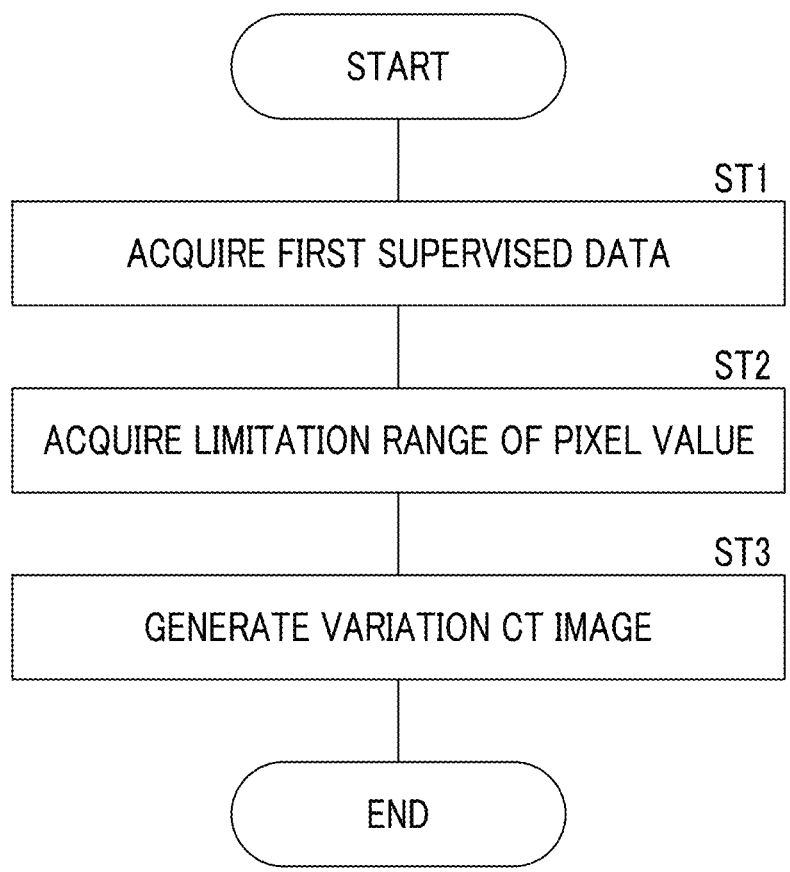
FIG. 8 is a flowchart showing a process of generating the variation CT image.

Next, a process of generating the variation CT image Bc2 according to the present exemplary embodiment will be described. FIG. 8 is a flowchart showing the process of generating the variation CT image Bc2. First, the supervised data acquisition unit 21 acquires the first supervised data D including the CT image Bc0 and the correct mask Bc1 as a pair (step ST1). Next, the limitation range acquisition unit 22 acquires the limitation range of the allowable pixel value of the pixel belonging to the infarcted region A in the CT image Bc0 (step ST2). Then, the variation learning image generation unit 23 generates the variation CT image Bc2 by giving variation to the pixel value of the infarcted region A of the CT image Bc0 as described above (step ST3), and terminates a series of processes.

With the learning image generation device according to the present exemplary embodiment, which is configured by the supervised data acquisition unit 21, the limitation range acquisition unit 22, and the variation learning image generation unit 23 configure, the learning image generation method according to the present exemplary embodiment, and the learning image generation program according to the present exemplary embodiment, it is possible to easily generate the variation CT image Bc2 having different pixel value of the pixel belonging to the infarcted region A from that of the CT image Bc0 by varying the pixel value of the pixel belonging to the infarcted region A within the limitation range of the allowable pixel value of the pixel belonging to the infarcted region A in the CT image Bc0. In addition, by changing the value to be varied, it is possible to generate a plurality of the variation CT images Bc2 having different pixel values of the pixels belonging to the infarcted region A. As a result, the limited CT image Bc0 can be used to generate the variation CT images Bc2 having different pixel value of the infarcted region A, so that it is possible to cover the variety of the pixel values of the infarcted region A to be segmented.

Note that in the first exemplary embodiment, the learning image generation device is configured by the supervised data acquisition unit 21, the limitation range acquisition unit 22, and the variation learning image generation unit 23. However, the technology of the present disclosure is not limited to this, and the limitation range acquisition unit 22 may not be provided. In this case, the variation learning image generation unit 23 need only vary the pixel value of the pixel belonging to the infarcted region A based on a predetermined limitation range.

Figure 9:
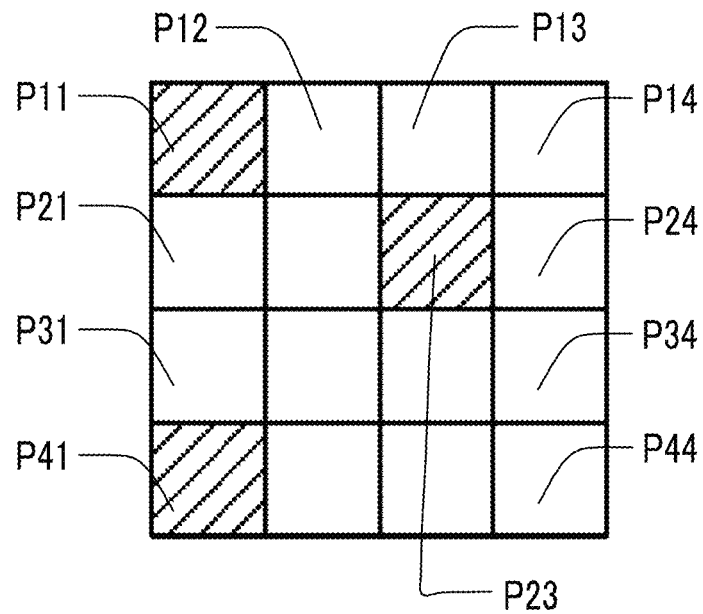
FIG. 9 is a diagram for describing a varying method of the pixel value according to a second exemplary embodiment.

In addition, in the first exemplary embodiment, the variation learning image generation unit 23 varies the pixel values of all of the pixels belonging to the infarcted region A in the CT image Bc0 by a certain value, but the technology of the present disclosure is not limited to this. For example, the pixel value of a part of the pixels belonging to the infarcted region A may be varied by a certain value. FIG. 9 is a diagram for describing a varying method of the pixel value according to a second exemplary embodiment.

As shown in FIG. 9, for example, the variation learning image generation unit 23 varies the pixel values of the three pixels of the pixel P11, the pixel P23, and the pixel P41 shown by diagonal lines by a certain value. Note that the pixel of which the pixel value is to be varied and the number the pixels of which the pixel value is to be varied may be set in advance or may be set randomly.

Figure 10:
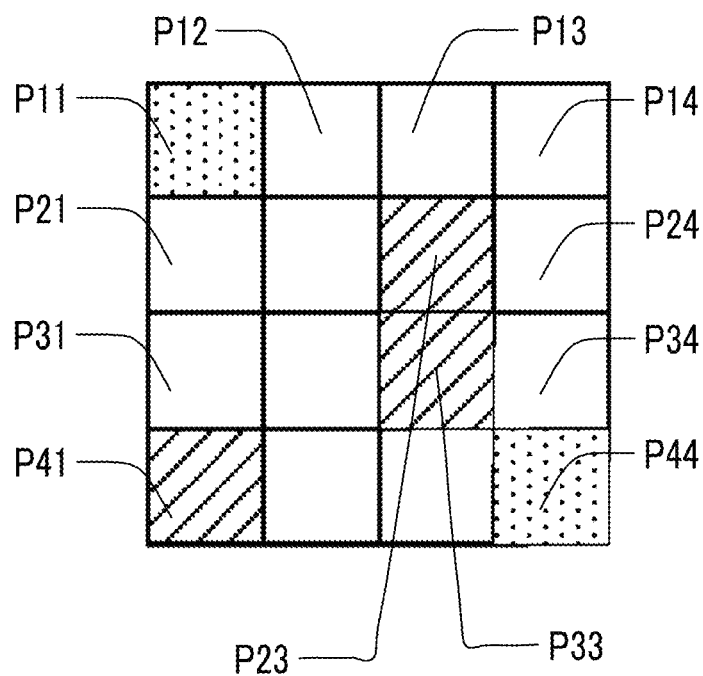
FIG. 10 is a diagram for describing the varying method of the pixel value according to a third exemplary embodiment.

In addition, in the first exemplary embodiment and the second exemplary embodiment, the variation learning image generation unit 23 varies the pixel values of all of the pixels belonging to the infarcted region A in the CT image Bc0 by a certain value. However, the technology of the present disclosure is not limited to this. For example, the pixel value may be varied by a different value for each pixel. FIG. 10 is a diagram for describing the varying method of the pixel value according to a third exemplary embodiment.

As shown in FIG. 10, for example, the variation learning image generation unit 23 varies the pixel values of the three pixels of the pixel P23, the pixel P33, and the pixel P41 shown by diagonal lines by a first value. In addition, the pixel values of the two pixels of the pixel P11 and the pixel P44 shown by shading are varied by a second value. The pixel of which the pixel value is to be varied by the first value and the number the pixels of which the pixel value is to be varied by the first value, and the pixel of which the pixel value is to be varied by the second value and the number the pixels of which the pixel value is to be varied by the second value may be set in advance or may be set randomly.

Figure 11:
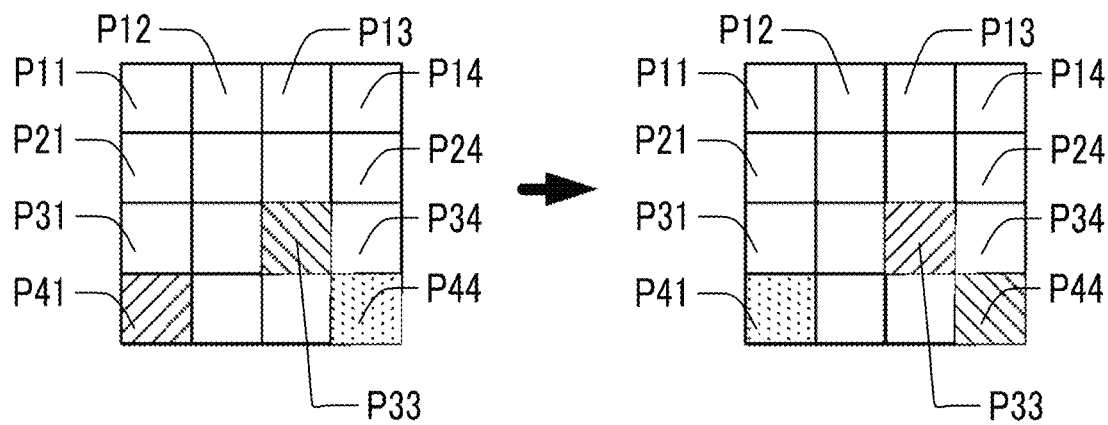
FIG. 11 is a diagram for describing the varying method of the pixel value according to a fourth exemplary embodiment.

In addition, in the first to third exemplary embodiments, the graph of the distribution shown in FIG. 5 is moved or transformed by the variation learning image generation unit 23 varying the pixel value of the pixel belonging to the infarcted region A in the CT image Bc0. However, the technology of the present disclosure is not limited to this. For example, the pixel belonging to the infarcted region A may be replaced. FIG. 11 is a diagram for describing the varying method of the pixel value according to a fourth exemplary embodiment.

As shown in FIG. 11, for example, the variation learning image generation unit 23 replaces the pixel value of the pixel P41 indicated by the diagonal line from the upper right toward the lower left with the pixel value of the pixel P44 indicated by shading. In addition, the pixel value of the pixel P33 indicated by the diagonal line from the upper left toward the lower right is replaced with the pixel value of the pixel P41 indicated by the diagonal line from the upper right toward the lower left. In addition, the pixel value of the pixel P44 indicated by shading is replaced with the pixel value of the pixel P33 indicated by the diagonal line from the upper left toward the lower right. In the present exemplary embodiment, since the pixel belonging to the infarcted region A is simply replaced, the pixel value of the pixel belonging to the infarcted region A can be varied while maintaining the distribution graph shown in FIG. 5. Note that the pixel of which the pixel value is to be replaced and the number the pixels of which the pixel value is to be replaced may be set in advance or may be set randomly.

Figure 12:
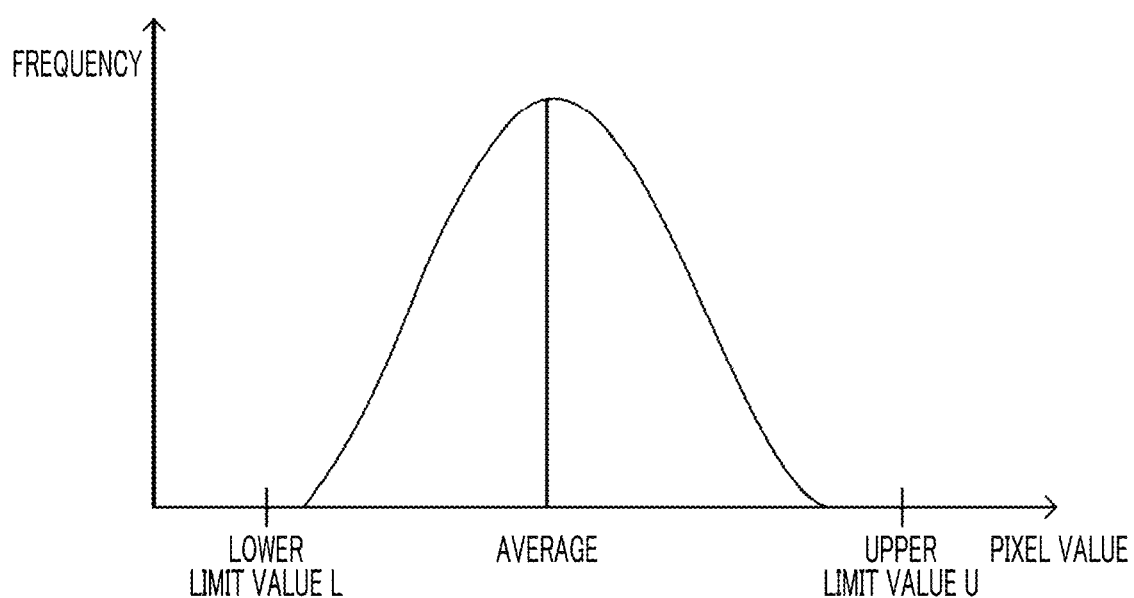
FIG. 12 is a diagram for describing the varying method of the pixel value according to a fifth exemplary embodiment.

In addition, an average and a standard deviation of the pixel values of the infarcted region A may be set in advance to determine the normal distribution, and the pixel value may be varied based on the determined normal distribution. FIG. 12 is a diagram for describing the varying method of the pixel value according to a fifth exemplary embodiment. As shown in FIG. 12, the variation learning image generation unit 23 determines the normal distribution of the pixel values of the infarcted region A by setting the average and the standard deviation between the lower limit value L and the upper limit value U of the limitation range of the allowable pixel value of the infarcted region A. The variation learning image generation unit 23 is varied the pixel value such that the pixel having each pixel value is present in the infarcted region A based on the graph of FIG. 12.

Figure 13:
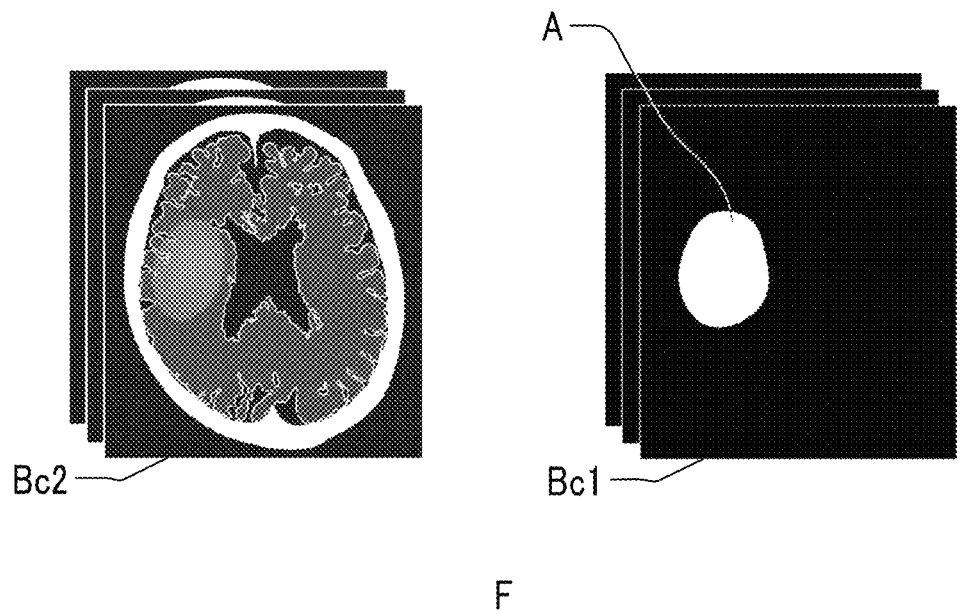
FIG. 13 is a diagram for describing second supervised data including the variation CT image and the correct CT image as a pair.

The variation CT image Bc2 generated by the variation learning image generation unit 23 as described above is stored in the storage 13 as the image data constituting the second supervised data F. FIG. 13 is a diagram for describing the second supervised data F including the variation CT image Bc2 and a correct CT image Bc1 as a pair. As shown in FIG. 13, the second supervised data F is the supervised data including the variation CT image Bc2 and the correct mask Bc1 in which the infarcted region A is defined in the CT image Bc0 before the variation of the variation CT image Bc2 as a pair. Note that in the present exemplary embodiment, the second supervised data F is the supervised data including the variation CT image Bc2 and the correct mask Bc1 in which the infarcted region A is defined in the CT image Bc0 before the variation of the variation CT image Bc2 as a pair, but may be the supervised data including the variation CT image Bc2 and a correct mask Bc3 in which the infarcted region A is newly defined in the variation CT image Bc2 as a pair. Note that since in the variation CT image Bc2, the pixel value of the pixel belonging to the infarcted region A is varied within the limitation range of the allowable pixel value of the infarcted region A in the CT image Bc0 before the variation, the correct mask Bc1 and the correct mask Bc3 in which the infarcted region A is newly defined in the variation CT image Bc2 are the same correct mask.

Figure 14:
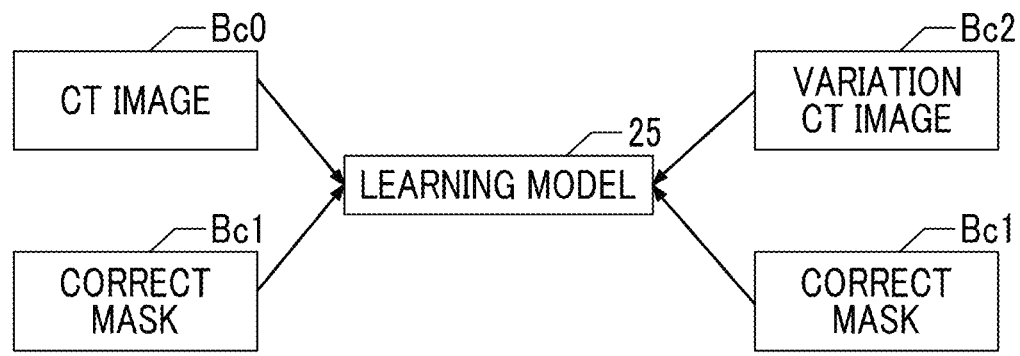
FIG. 14 is a diagram for describing a learning model.

Next, returning to FIG. 2, the learning unit 24 learns the learning model 25 by using one or more first supervised data D and one or more second supervised data F, which are acquired by the supervised data acquisition unit 21. FIG. 14 is a diagram for describing a learning method of the learning model. Note that in the present exemplary embodiment, the learning model 25 corresponds to the model according to the present disclosure.

The learning model 25 is a model learned to output the infarcted region in the CT image in a case in which the CT image in which the infarcted region is to be detected is input. In the present exemplary embodiment, the learning model 25 has a U Networks (U-Net) structure. The U-Net is one of fully convolution network (FCN) and is a network specialized for image segmentation.

As shown in FIG. 14, the learning unit 24 inputs the first supervised data D, that is, the CT image Bc0 and the correct mask Bc1 to a learning model M to cause the learning model M to learn the infarcted region A in the CT image Bc0. As a result, in a case in which the CT image Bc0 is input, the learning model M is learned to output a region matching the correct mask Bc1 is output as the infarcted region A. In addition, the learning unit 24 inputs the second supervised data F, that is, the variation CT image Bc2 and the correct mask Bc1 to a learning model M to cause the learning model M to learn the infarcted region A in the variation CT image Bc2. As a result, in a case in which the variation CT image Bc2 is input, the learning model M is learned to output a region matching the correct mask Bc1 is output as the infarcted region A.

Next, the learning method of the learning model 25 by using the one or more first supervised data D and the one or more second supervised data F will be described. Generally, in a case in which the learning model 25 is learned, for example, n supervised data are learned by the learning model 25 in order. Then, in a case in which all of the n supervised data are learned, the learning model 25 is learned by using the n supervised data again as second learning, and the learning model 25 is learned by using the same supervised data a predetermined number of times.

Figure 15:
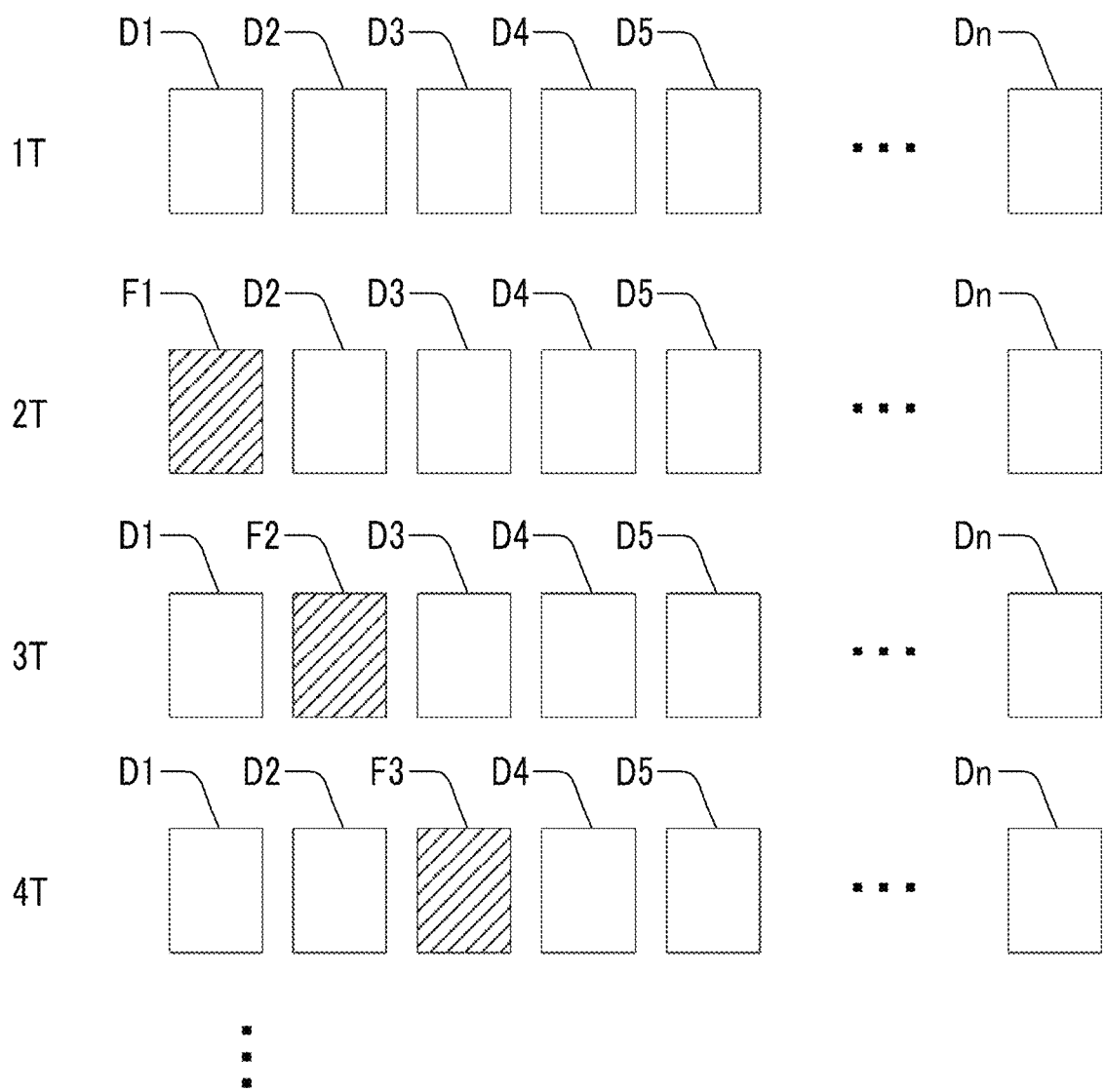
FIG. 15 is a diagram for describing a learning method using the first supervised data and the second supervised data according to a sixth exemplary embodiment.

In the present exemplary embodiment, in a case in which the learning model 25 is learned by using the n first supervised data D1 to Dn, as first learning, the learning model 25 is learned by using the n first supervised data D1 to Dn. Next, in the second and subsequent learning, at least one first supervised data D of the n first supervised data D1 to Dn is replaced with the second supervised data F to learn the learning model 25. FIG. 15 is a diagram for describing the learning method using the first supervised data D and the second supervised data F in a sixth exemplary embodiment. Note that the first supervised data D and the second supervised data F are a combination of the CT image Bc0 or the variation CT image Bc2 and the correct mask Bc1, that is, are constituted by two image data, but in FIG. 15, the first supervised data D and the second supervised data F are represented by one image for convenience of description. Note that it may be represented in the same manner in the following drawings.

As shown in FIG. 15, the learning unit 24 learns the learning model 25 by using the n first supervised data D1 to Dn at the time of first learning (1T). At the time of second learning (2T), the learning model 25 is learned by replacing the first supervised data D1 with second supervised data F1. At the time of third learning (3T), the second supervised data F1 is returned to the first supervised data D1, and the first supervised data D2 is replaced with second supervised data F2 to learn the learning model 25. Further, at the time of fourth learning (4T), the second supervised data F2 is returned to the first supervised data D2, and the first supervised data D3 is replaced with second supervised data F3 to learn the learning model 25.

As described above, in the sixth exemplary embodiment, in the second and subsequent learning, the learning model 25 is learned by replacing one first supervised data D of the n first supervised data D1 to Dn with the second supervised data F for each learning. In a case in which n+1 learning is terminated, the process returns to the first learning (1T), and the learning described above is repeated until the set number of learning is terminated.

Figure 16:
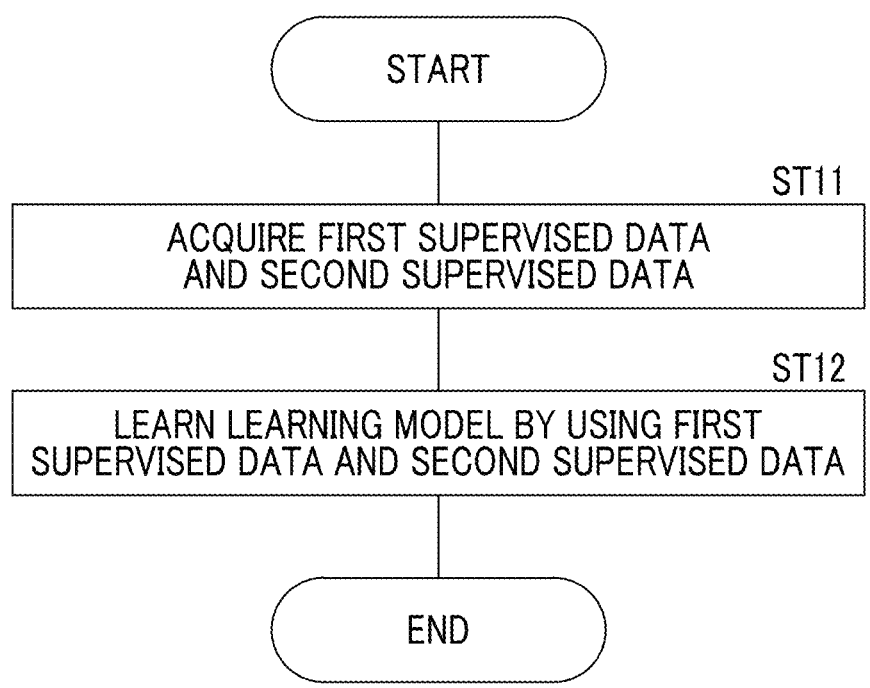
FIG. 16 is a flowchart showing a process performed at the time of learning.

Then, a series of processes in the sixth exemplary embodiment will be described. FIG. 16 is a flowchart showing a process performed at the time of learning. First, the supervised data acquisition unit 21 acquires the first supervised data D and the second supervised data F from the image storage server 3 and the storage 13 (step ST11). Next, the learning unit 24 learns the learning model 25 as described above by using the first supervised data D and the second supervised data F, which are acquired (step ST12), and terminates a series of processes.

In the sixth exemplary embodiment, within the limitation range of the allowable pixel value of the pixel belonging to the infarcted region A in the CT image Bc0, the second supervised data F including the variation CT image Bc2 having different pixel value of the pixels belonging to the infarcted region A from that of the CT image Bc0, which is generated by varying the pixel value of the pixel belonging to the infarcted region A, and the correct mask Bc1 as a pair is used for learning. As described above, rather than learning the learning model 25 by using only the first supervised data D, by using the second supervised data F, the variation CT image Bc2 in which the infarcted region A having the pixel value different from the pixel value of the infarcted region A of the first supervised data D is defined is used as the supervised data. Therefore, in the present exemplary embodiment, it is possible to cover the variety of the pixel values of the infarcted region A to be segmented.

Figure 17:
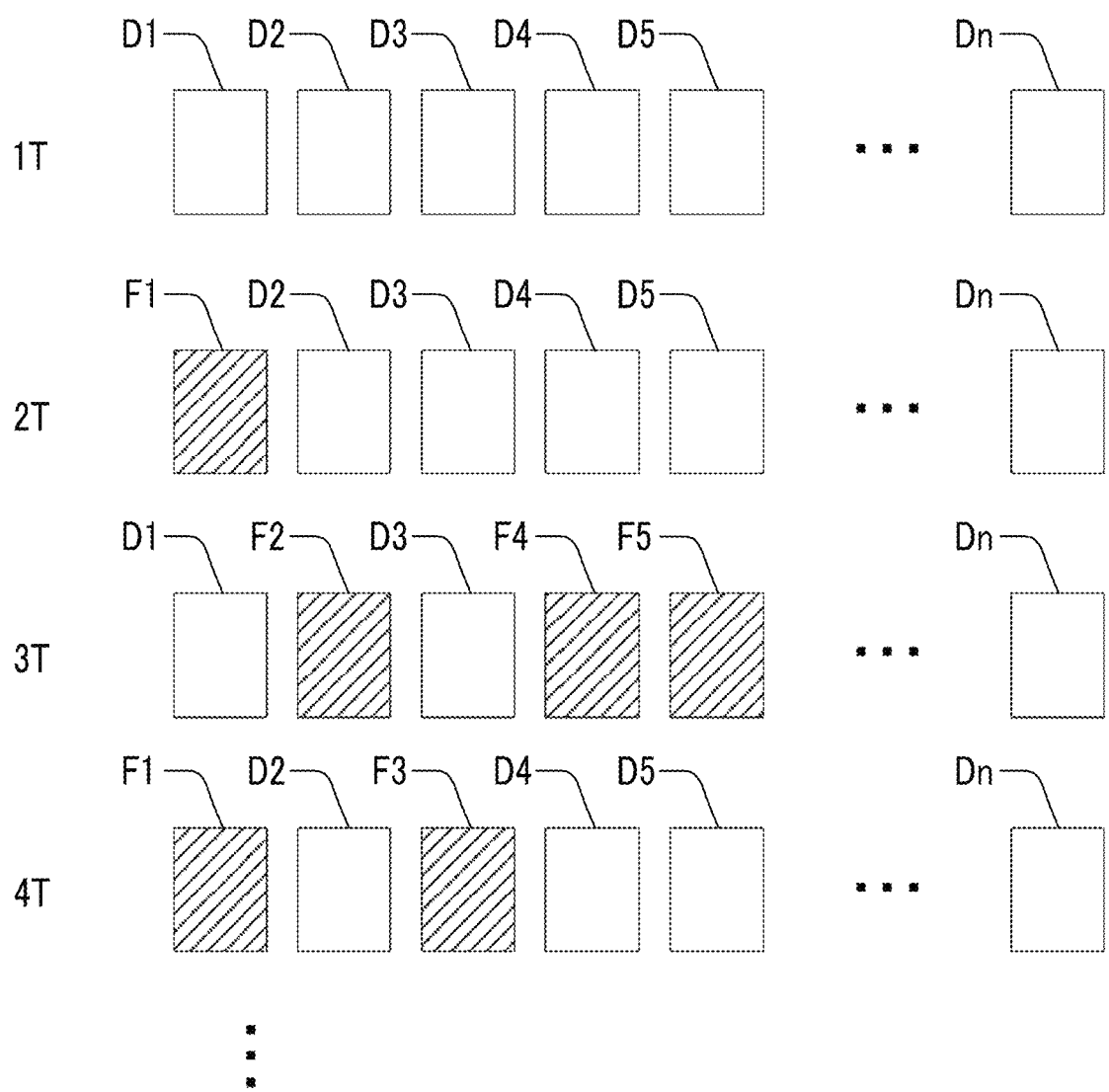
FIG. 17 is a diagram for describing the learning method using the first supervised data and the second supervised data according to a seventh exemplary embodiment.

Note that in the sixth exemplary embodiment, in the second and subsequent learning, one first supervised data D is replaced with the second supervised data F to learn the learning model 25 for each learning, but the technology of the present disclosure is not limited to this. The two first supervised data D may be replaced with the second supervised data F, or any number of the first supervised data D, such as three or four, can be replaced with the second supervised data F. In addition, only a predetermined first supervised data D may be replaced with the second supervised data F which is different for each learning. In addition, the first supervised data D to be changed to the second supervised data F may be randomly selected. In addition, the number of the first supervised data D to be changed to the second supervised data F may be randomly determined. In addition, both the first supervised data D to be changed to the second supervised data F and the number of the first supervised data D to be changed to the second supervised data F may be randomly determined. FIG. 17 is a diagram for describing the learning method using the first supervised data D and the second supervised data F in a seventh exemplary embodiment.

As shown in FIG. 17, the learning unit 24 learns the learning model 25 by using the n first supervised data D1 to Dn at the time of the first learning (1T). At the time of the second learning (2T), the learning model 25 is learned by replacing the first supervised data D1 with the second supervised data F1. At the time of the third learning (3T), the learning model 25 is learned by returning the second supervised data F1 to the first supervised data D1 and by replacing the first supervised data D2 with the second supervised data F2, the first supervised data D4 with second supervised data F4, and the first supervised data D5 with second supervised data F5. Further, at the time of the fourth learning (4T), the learning model 25 is learned by returning the second supervised data F2 to the first supervised data D2, the second supervised data F4 to first supervised data D4, and the second supervised data F5 to the first supervised data D5, and by replacing the first supervised data D1 with the second supervised data F1 and the first supervised data D3 with the second supervised data F3.

Figure 18:
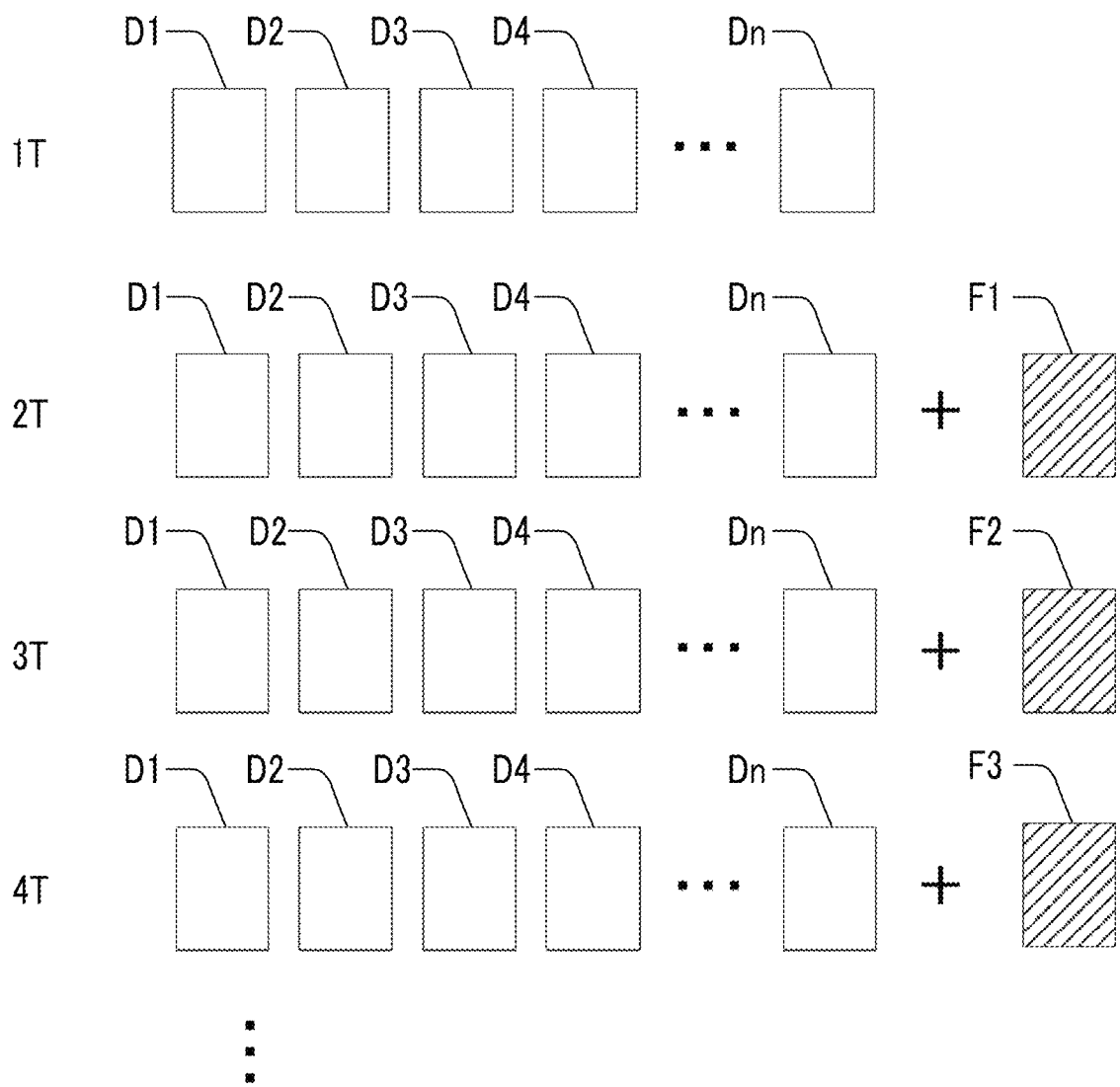
FIG. 18 is a diagram for describing the learning method using the first supervised data and the second supervised data according to an eighth exemplary embodiment.

Note that in the sixth exemplary embodiment and the seventh exemplary embodiment, in the second and subsequent learning, the first supervised data D is replaced with the second supervised data F to learn the learning model 25 for each learning, but the technology of the present disclosure is not limited to this. The learning model 25 may be learned by adding the second supervised data F to the n first supervised data Dn for each learning. FIG. 18 is a diagram for describing the learning method using the first supervised data D and the second supervised data F in an eighth exemplary embodiment.

As shown in FIG. 18, the learning unit 24 learns the learning model 25 by using the n first supervised data D1 to Dn at the time of the first learning (1T). At the time of the second learning (2T), the learning model 25 is learned by adding the second supervised data F1. At the time of the third learning (3T), the learning model 25 is learned by adding the second supervised data F2. Further, at the time of the fourth learning (4T), the learning model 25 is learned by adding the second supervised data F3.

As described above, in the eighth exemplary embodiment, in the second and subsequent learning, the learning model 25 is learned by further adding one second supervised data F to the n first supervised data D1 to Dn for each learning. In a case in which n+1 learning is terminated, the process returns to the first learning (1T), and the learning described above is repeated until the set number of learning is terminated.

Figure 19:
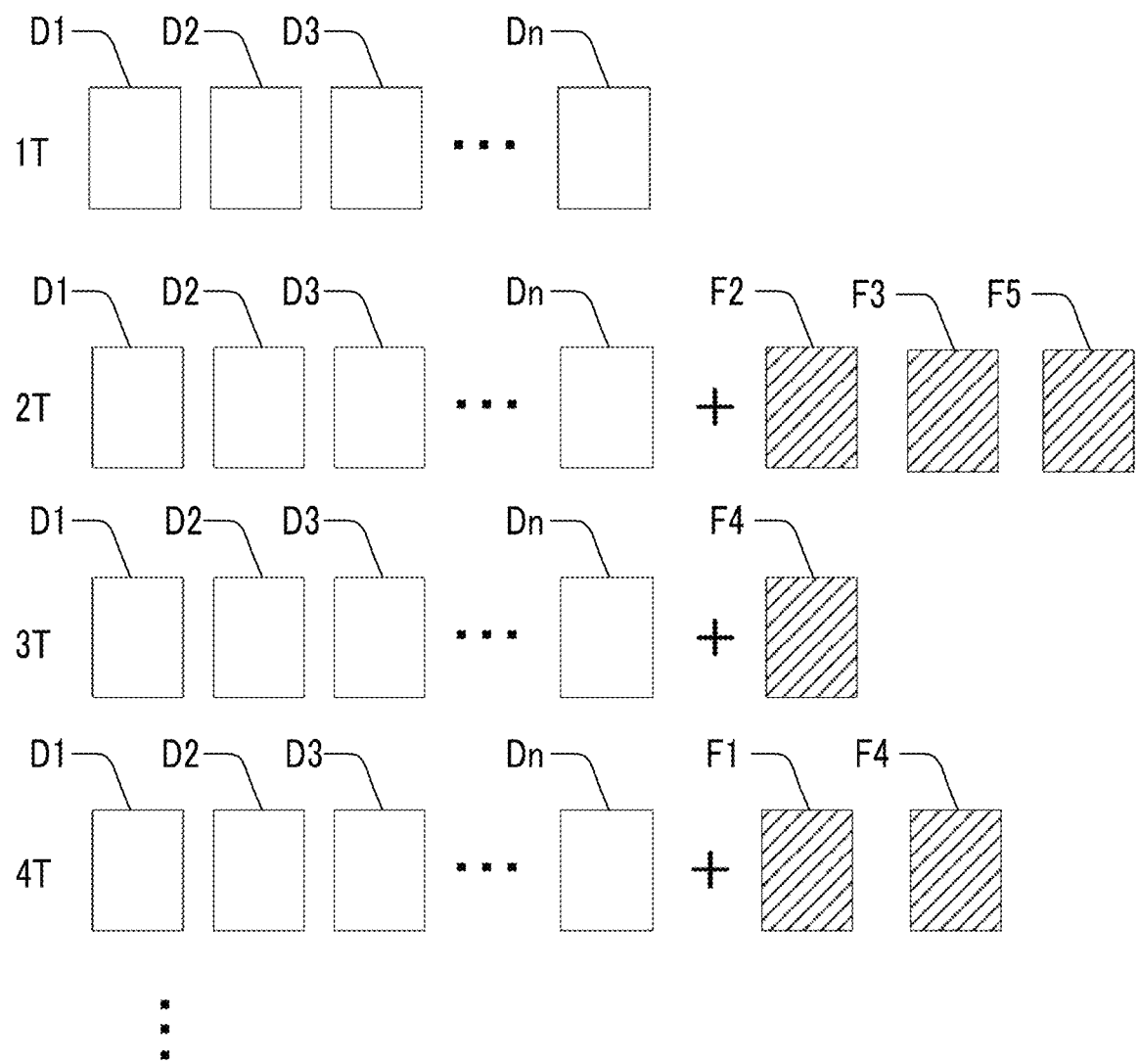
FIG. 19 is a diagram for describing the learning method using the first supervised data and the second supervised data according to a ninth exemplary embodiment.

Note that in the eighth exemplary embodiment, the learning model 25 is learned by adding one second supervised data F for each learning in the second and subsequent learning. However, the technology of the present disclosure is not limited to this. Two second supervised data F may be added, or any number of the second supervised data F, such as three or four, can be added. In addition, the second supervised data F to be added may be randomly selected. FIG. 19 is a diagram for describing the learning method using the first supervised data D and the second supervised data F in a ninth exemplary embodiment.

As shown in FIG. 19, the learning unit 24 learns the learning model 25 by using the n first supervised data D1 to Dn at the time of the first learning (1T). At the time of the second learning (2T), the learning model 25 is learned by adding the second supervised data F2, the second supervised data F3, and the second supervised data F5. At the time of the third learning (3T), the learning model 25 is learned by adding the second supervised data F4. Further, at the time of the fourth learning (4T), the learning model 25 is learned by adding the second supervised data F1 and the second supervised data F4.

As described above, in the ninth exemplary embodiment, in the second and subsequent learning, the learning model 25 is learned by adding a random number of the second supervised data F to the n first supervised data D1 to Dn for each learning until the set number of learning is terminated.

Figure 20:
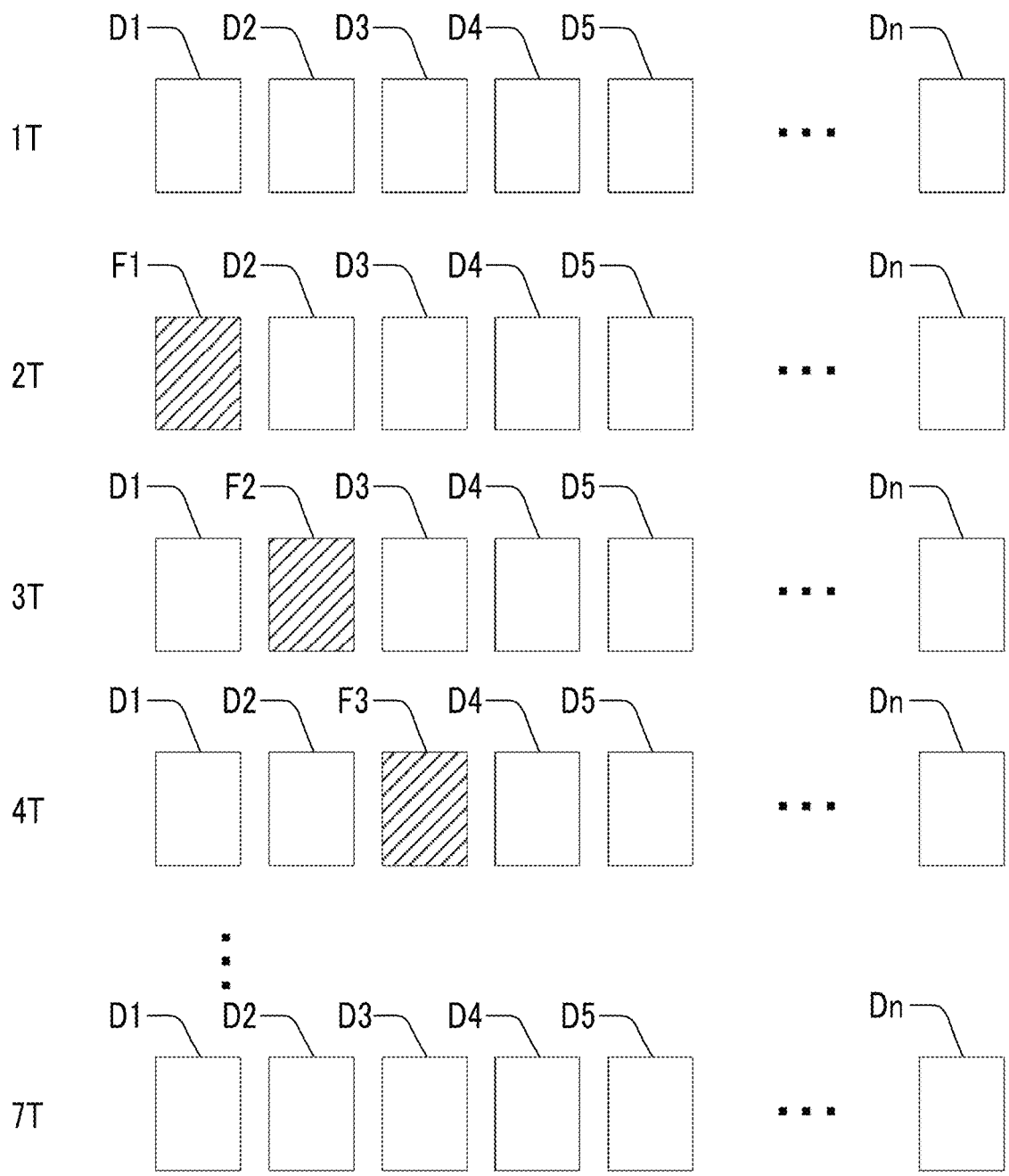
FIG. 20 is a diagram for describing the learning method using the first supervised data and the second supervised data according to a tenth exemplary embodiment.

Note that the learning method of the learning model 25 according to the present disclosure is not limited to the learning method shown in the sixth to ninth exemplary embodiments. FIG. 20 is a diagram for describing the learning method using the first supervised data D and the second supervised data F in a tenth exemplary embodiment.

As shown in FIG. 20, the learning unit 24 learns the learning model 25 by using only the n first supervised data D1 to Dn in the second and subsequent learning at least once, and in the seventh learning in the present exemplary embodiment. Note that the number of learning of the learning model 25 by using only the n first supervised data D1 to Dn is not limited to the seventh learning, and may be any learning. In addition, the learning model 25 may be learned by using only the n first supervised data D1 to Dn twice, three times, and n times.

Note that in the exemplary embodiments described above, the disease is the infarction, but the technology of the present disclosure is not limited to this, and for example, the disease may be bleeding or the like.

In addition, in the exemplary embodiments described above, the CT image is used as the learning image according to the present disclosure. However, the technology of the present disclosure is not limited to this, and the learning image according to the present disclosure may be another medical image, such as the PET image, the ultrasound image, and the MRI image. The MRI image may be any one of a T1 image, a T2 image, and a diffusion emphasis image.

In addition, in the exemplary embodiments described above, the brain image is used as the medical image, but the technology of the present disclosure is not limited to this. For example, the present disclosure can also be applied to discriminate the diseased region and a region of interest included in the medical images of chest, abdomen, whole body, limbs, and the like of the human body.

In addition, in the exemplary embodiments described above, the learning device 1 encompasses the learning image generation device, but the technology of the present disclosure is not limited to this, and the learning image generation device may not be encompassed. Note that in this case, the learning device 1 shall comprise the supervised data acquisition unit 21, and the supervised data acquisition unit 21 need only acquire the second supervised data including the variation learning image generated by an external learning image generation device.

In addition, in the exemplary embodiments described above, the learning model 25 has the U-Net structure, but the technology of the present disclosure is not limited to this. A fully convolutional network (FCN) may be used instead of the U-Net. Note that in a case in which a model for learning a segmentation problem by the end-to-end deep learning, it can be widely applied not only to the U-Net and the FCN.

In addition, in the exemplary embodiments described above, for example, various processors shown below can be used as the hardware structures of processing units that execute various processes, such as the supervised data acquisition unit 21, the limitation range acquisition unit 22, the variation learning image generation unit 23, the learning unit 24, the learning model 25, and the display control unit 26. As described above, the various processors include, in addition to the CPU, which is a general-purpose processor which executes software (program) and functions as various processing units, a programmable logic device (PLD) which is a processor whose circuit configuration can be changed after manufacture, such as a field programmable gate array (FPGA), and a dedicated electric circuit which is a processor having a circuit configuration which is designed for exclusive use in order to execute a specific process, such as an application specific integrated circuit (ASIC).

One processing unit may be configured by one of the various processors, or may be a combination of two or more processors of the same type or different types (for example, a combination of a plurality of FPGAs or a combination of the CPU and the FPGA). In addition, a plurality of the processing units may be configured by one processor.

As an example of configuring the plurality of processing units by one processor, first, as represented by a computer, such as a client and a server, there is a form in which one processor is configured by a combination of one or more CPUs and software and this processor functions as the plurality of processing units. Second, as represented by a system on chip (SoC) or the like, there is a form of using a processor that realizes the function of the entire system including the plurality of processing units with one integrated circuit (IC) chip. In this way, as the hardware structure, various processing units are configured by one or more of various processors described above.

Further, as the hardware structure of these various processors, more specifically, it is possible to use an electrical circuit (circuitry) in which circuit elements such as semiconductor elements are combined.

The disclosure of JP2019-121325A filed on Jun. 28, 2019 is incorporated in the present specification by reference in its entirety.

All of the documents, the patent applications, and the technical standards described in the present specification are incorporated in the present specification by reference to the same extent as a case in which individual document, patent application, and technical standard are specifically and individually noted to be incorporated by reference.

What is claimed is:

1. A learning image generation device comprising:
a memory; and
a processor coupled to the memory, the processor configured to:
   acquire supervised data including a learning image and a correct region defined in the learning image as a pair;
   acquire a limitation range of allowable pixel values for a first designated pixel belonging to the correct region in the learning image;
   generate a plurality of variable pixel values for the first designated pixel belonging to the correct region in the learning image according to the limitation range; and
   generate a plurality of variation learning images, wherein a pixel value of a second designated pixel in each of the plurality of variation learning images is respectively a different pixel value among the plurality of variation pixel values, and wherein the first designated pixel in the learning image and the second designated pixel in each of the plurality of variation learning images have same pixel coordinates.

2. The learning image generation device according to claim 1, wherein the processor is configured to generate the plurality of variable pixel values in response to a normal distribution set for the correct region.

3. A learning image generation method comprising:
acquiring supervised data including a learning image and a correct region defined in the learning image as a pair;
acquiring a limitation range of allowable pixel values for a first designated pixel belonging to the correct region in the learning image;
generating a plurality of variable pixel values for the first designated pixel belonging to the correct region in the learning image according to the limitation range; and
generating a plurality of variation learning images, wherein a pixel value of a second designated pixel in each of the plurality of variation learning images is respectively a different pixel value among the plurality of variation pixel values, and wherein the first designated pixel in the learning image and the second designated pixel in each of the plurality of variation learning images have same pixel coordinates.

4. A non-transitory computer recording medium storing a learning image generation program causing a computer to:
acquire supervised data including a learning image and a correct region defined in the learning image as a pair;
acquire a limitation range of allowable pixel values for a first designated pixel belonging to the correct region in the learning image;
generate a plurality of variable pixel values for the first designated pixel belonging to the correct region in the learning image according to the limitation range; and
generate a plurality of variation learning images, wherein a pixel value of a second designated pixel in each of the plurality of variation learning images is respectively a different pixel value among the plurality of variation pixel values, and wherein the first designated pixel in the learning image and the second designated pixel in each of the plurality of variation learning images have same pixel coordinates.

5. A learning method comprising:
learning a model by using
   one or more first supervised data including a learning image and a correct region defined in the learning image as a pair, and
   one or more second supervised data including a plurality of variation learning images and a correct region defined in the learning image as a pair,
   wherein the plurality of variation learning images are generated by acquiring a limitation range of allowable pixel values for a first designated pixel belonging to the correct region in the learning image and generating a plurality of variable pixel values for the first designated pixel in the learning image according to the limitation range, wherein a value of a second designated pixel in each of the plurality of variation learning images is respectively a different pixel value among the plurality of variation pixel values, and wherein the first designated pixel in the learning image and the second designated pixel in each of the plurality of variation learning images have same pixel coordinates.

6. The learning method according to claim 5, wherein:
the model is learned by using a plurality of the first supervised data in first learning, and
the model is learned by replacing at least one first supervised data among the plurality of first supervised data with the second supervised data in second and subsequent learning.

7. The learning method according to claim 5, wherein
the model is learned by using a plurality of the first supervised data in first learning, and
the model is learned by adding at least one second supervised data in second and subsequent learning.

8. The learning method according to claim 6, wherein at least one of the second supervised data to be used or the number of the second supervised data is randomly set for each learning in the second and subsequent learning.

9. The learning method according to claim 6, wherein at least one of the second supervised data to be used or the number of the second supervised data is set in advance in the second and subsequent learning.

10. The learning method according to claim 6, wherein the model is learned by using only the plurality of first supervised data at least once in the second and subsequent learning.

11. A learning device comprising:
a memory; and
a processor coupled to the memory, the processor configured to:
   acquire one or more first supervised data including a learning image and a correct region defined in the learning image as a pair;
   acquire one or more second supervised data including a plurality of variation learning images and a correct region defined in the learning image as a pair, wherein the plurality of variation learning images are generated by acquiring a limitation range of allowable pixel values for a first designated pixel belonging to the correct region in the learning image and generating a plurality of variable pixel values for the first designated pixel in the learning image according to the limitation range, wherein a value of a second designated pixel in each of the plurality of variation learning images is respectively a different pixel value among the plurality of variation pixel values, and wherein the first designated pixel in the learning image and the second designated pixel in each of the plurality of variation learning images have same pixel coordinates; and learn a model by using the acquired one or more first supervised data and the acquired one or more second supervised data.

12. A learning device comprising:

a memory; and a processor coupled to the memory, the processor configured to:

acquire one or more first supervised data including a learning image and a correct region defined in the learning image as a pair;

acquire one or more second supervised data including a plurality of variation learning images and a correct region defined in the learning image as a pair, wherein the plurality of variation learning images are generated by acquiring a limitation range of allowable pixel values for a first designated pixel belonging to the correct region in the learning image and generating a plurality of variable pixel values for the first designated pixel in the learning image according to the limitation range, wherein a value of a second designated pixel in each of the plurality of variation learning images is respectively a different pixel value among the plurality of variation pixel values, and wherein the first designated pixel in the learning image and the second designated pixel in each of the plurality of variation learning images have same pixel coordinates; and learn a model by using the acquired one or more first supervised data and the acquired one or more second supervised data, wherein the model is learned by using a plurality of the first supervised data in the first learning, and the model is learned by replacing at least one first supervised data among the plurality of first supervised data with the second supervised data in second and subsequent learning.

13. A non-transitory computer recording medium storing a learning program causing a computer to:

acquire one or more first supervised data including a learning image and a correct region defined in the learning image as a pair;

acquire one or more second supervised data including a plurality of variation learning images and a correct region defined in the learning image as a pair, wherein the plurality of variation learning images are generated by acquiring a limitation range of allowable pixel values for a first designated pixel belonging to the correct region in the learning image and generating a plurality of variable pixel values for the first designated pixel in the learning image according to the limitation range, wherein a value of a second designated pixel in each of the plurality of variation learning images is respectively a different pixel value among the plurality of variation pixel values, and wherein the first designated pixel in the learning image and the second designated pixel in each of the plurality of variation learning images have same pixel coordinates; and learn a model by using the one or more first supervised data and the one or more second supervised data acquired by the supervised data acquisition unit.

14. The learning device according to claim 1, wherein an upper limit of the limitation range for generating the plurality of variable pixel values in the plurality of variation learning images is greater than an upper limit of a range of pixel values in the correct region in the learning image, and wherein a lower limit of the limitation range for generating the plurality of variable pixel values in the plurality of variation learning images is less than a lower limit of a range of pixel values in the correct region in the learning image.

15. The learning device according to claim 1, wherein the learning image is a medical image, and wherein an upper limit and a lower limit of the limitation range is set based on a type of the medical image and a type of lesion to be detected.

* * * * *